US007662282B2

(12) United States Patent
Lee et al.

(10) Patent No.: US 7,662,282 B2
(45) Date of Patent: Feb. 16, 2010

(54) PERMANENT MAGNET ARRAY IRON FILTER

(75) Inventors: Seong-Jae Lee, Ames, IA (US); Dennis O'Neel, West Des Moines, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 368 days.

(21) Appl. No.: 11/616,197

(22) Filed: Dec. 26, 2006

(65) Prior Publication Data

US 2008/0149549 A1 Jun. 26, 2008

(51) Int. Cl.
*B01D 35/06* (2006.01)

(52) U.S. Cl. ........................ 210/222; 210/223; 184/6.25

(58) Field of Classification Search ................. 210/222, 210/223; 184/6.25
See application file for complete search history.

(56) References Cited

U.S. PATENT DOCUMENTS

| | | | |
|---|---|---|---|
| 5,149,084 | A | 9/1992 | Dalebout et al. |
| RE34,728 | E | 9/1994 | Hall-Tipping |
| 5,354,462 | A | 10/1994 | Perritt et al. |
| 5,362,069 | A | 11/1994 | Hall-Tipping |
| 5,556,540 | A | 9/1996 | Brunsting |
| 5,714,063 | A | 2/1998 | Brunsting |
| 5,932,108 | A | 8/1999 | Brunsting |
| 6,004,243 | A | 12/1999 | Ewert |
| 6,142,913 | A | 11/2000 | Ewert |
| 6,244,988 | B1 | 6/2001 | Delman |
| 6,312,363 | B1 | 11/2001 | Watterson et al. |
| 6,458,060 | B1 | 10/2002 | Watterson et al. |
| 6,626,799 | B2 | 9/2003 | Watterson et al. |
| 6,749,537 | B1 | 6/2004 | Hickman |
| 6,808,472 | B1 | 10/2004 | Hickman |
| 6,905,440 | B2 | 6/2005 | Heppert |
| 6,921,351 | B1 | 7/2005 | Hickman et al. |

FOREIGN PATENT DOCUMENTS

| | | |
|---|---|---|
| WO | WO/93/01595 | 8/1993 |
| WO | WO/94/16774 | 8/1994 |
| WO | WO/98/19746 | 5/1998 |

*Primary Examiner*—David A Reifsnyder
(74) *Attorney, Agent, or Firm*—Patwrite LLC; Mark David Torche

(57) ABSTRACT

A permanent magnet array iron filter has a generally circular collar made of a high magnetic permeability material with a plurality of magnetic assemblies interiorly disposed longitudinally around an interior circumference therein. Each magnetic assembly has two magnets with opposite poles facing the center of the filter and a gap between the adjacent assemblies. This arrangement intensifies the resultant magnetic field and projects the field deeply within the interior region of the filter. Rare earth permanent magnets are used to maximize the magnetic field. The collar may be coated with a plastic coating to protect the filter. The collar has a gap to provide flexibility when sliding the filter over an oil filter. The thickness of the collar may be adjusted to meet the requirements of a particular application.

20 Claims, 5 Drawing Sheets

PERMANENT MAGNET ARRAY IRON FILTER

BACKGROUND OF THE INVENTION

Mechanical inventions generally involve moving parts. The internal combustion engine has undoubtedly revolutionized the world we live in, however because parts need to move past each other destructive abrasion occurs. It was discovered early on that keeping a surface lubricated with oil, reduced friction and improved performance. However, although lubrication allows the engine to operate with an acceptable service life, abrasion still occurs and results in ferrous substances being deposited in the lubricant. This leads to increased wear of engine parts and premature breakdown of the lubricant.

To combat this problem, various mechanical filters have been devised but none of them have been able to remove the iron particles with complete success. Standard mechanical filtration is most effective for particles approximately 20 μm and larger. Many of the destructive ferrous contaminants present in lubricants are under the 20 μm limit and therefore are not removed by conventional filters causing premature wear and breakdown.

Because iron wear particles are ferromagnetic, they are easily attracted to magnets. Therefore, magnets have been used to try to remove ferrous contaminants from oil, but it is difficult to project the magnetic field throughout the flow area to ensure that the ferrous particles will be trapped in the fast moving oil. There is a need for a filter that effectively removes iron particles from lubricants and other substances.

To provide a comprehensive disclosure without unduly lengthening the specification, applicant incorporates herein by reference the disclosure of U.S. patent application Ser. No. 11/306,571 to the present inventors, filed Jan. 3, 2006, now abandoned.

SUMMARY OF THE INVENTION

A permanent magnet array iron filter has a generally circular collar made of a high magnetic permeability material with a plurality of magnetic assemblies interiorly disposed longitudinally around an interior circumference therein. Each magnetic assembly has two magnets with opposite poles facing the center of the filter and a gap between the adjacent assemblies. This arrangement intensifies the resultant magnetic field and projects the field deeply within the interior region of the filter. Rare earth permanent magnets are used to maximize the magnetic field. The collar may be coated with a plastic coating to protect the filter. The collar has a gap to provide flexibility when sliding the filter over an oil filter. The thickness of the collar may be adjusted to meet the requirements of a particular application.

Other features and advantages of the instant invention will become apparent from the following description of the invention which refers to the accompanying drawings.

DETAILED DESCRIPTION OF THE INVENTION

Figure 1:
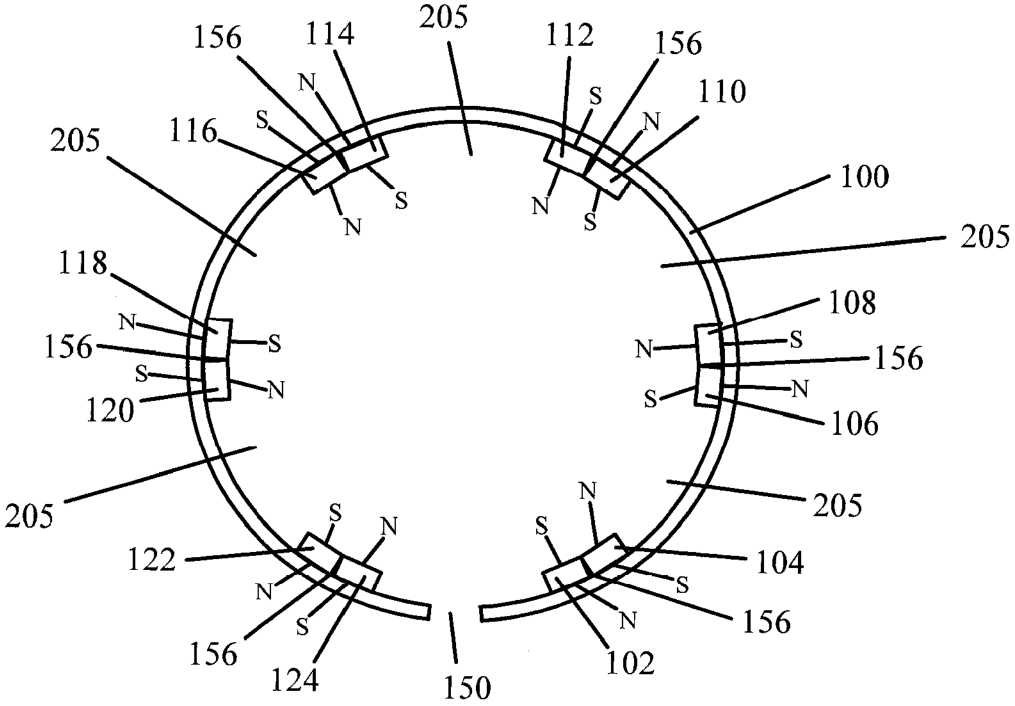
FIG. 1 is a top view of a permanent magnet array iron filter according to an embodiment of the present invention.

Reference is now made to the drawings in which reference numerals refer to like elements.

Figure 4:
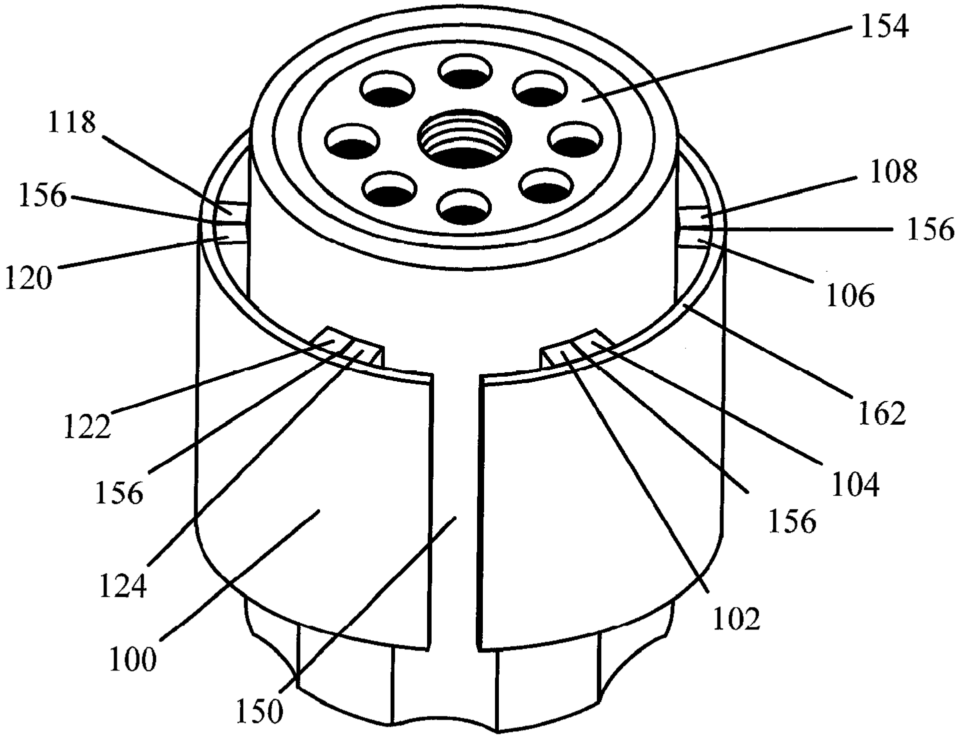
FIG. 4 is a perspective view showing an embodiment of the present invention with an oil filter inserted therein.
Figure 6:
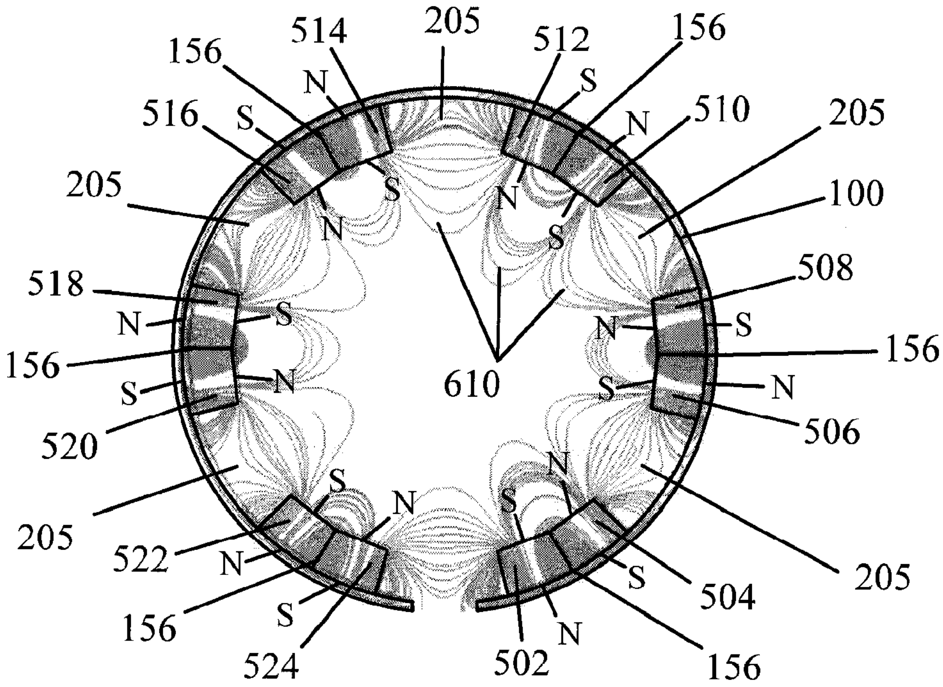
FIG. 6 is a top view of a permanent magnet array iron filter showing the magnetic field according to an embodiment of the present invention.

Referring to FIGS. 1, 4 and 6, a permanent magnet array iron filter has a circular collar 100. Collar 100 is made of a high magnetic permeability material. Collar 100 has a gap 150 to allow collar 100 to flex for use with an oil filter 154. Collar 100 may be fabricated from a single sheet of material or it may be manufactured from multiple layers to provide additional flexibility. Collar 100 may be made from spring steel or any other appropriate high magnetic permeability material as is known in the art. The thickness of collar 100 may be varied according to the application depending on the available space between oil filter 154 and the engine (not shown) and the shielding level required for leakage of the magnetic fields. A plurality of magnetic assemblies 156 are distributed longitudinally around the inside of collar 100. The embodiment shown in FIG. 1 has six magnetic assemblies 156. Six gaps 205 are formed between each magnetic assembly 156. These gaps 205, intensify the directional properties of a magnetic field 610 and ensure that magnetic field 610 is effective in attracting and holding iron particles that are normally suspending within the lubricant and away from the inner surface of oil filter 154.

Typically, a magnetic assembly 156 is made by placing two paired magnets 102 and 104 respectively so that their poles are opposite each other and orientated radially so that the poles of each magnet 102 and 104 face inward and outward. Glues, epoxies, plastic coatings or mechanical attachments such as rivets or screws may be used to secure magnets 102 and 104 to collar 100 or the assembly may be held in place simply by the magnetic attraction of magnets 102 and 104 with collar 100. The height of magnetic assembly 156 is selected to be effective for the application. The Applicants have utilized magnetic assemblies having a height of 50 mm, but the height may be longer or shorter depending on the application. To resist corrosion and endure the harsh environment present in use, the magnets making up magnetic assemblies 156 may be plated for example with a three layer coat of Ni+Cu+Ni. The present invention, although shown applied to oil filters, is applicable to any filtering application where ferrous particles need to be captured and contained for removal such as in water filtration systems, filtering hydraulic fluid in hydraulic systems and pumps, or biological fluid filtering.

Each magnetic assembly 156 is made of a magnet pair, 102-104, 106-108, 110-112, 114-116, 118-120, and 122-124 and are arranged generally symmetrically inside collar 100;

however, although it is very important that gaps 205 are disposed between magnetic assemblies 156, the spacing can vary depending on the application and perfect symmetry is not required. The arrangement of the poles of each magnet is shown in the figures by the traditional “N” and “S” notation for clarification. Other arrangements are possible and several embodiments are discussed below.

Figure 2:
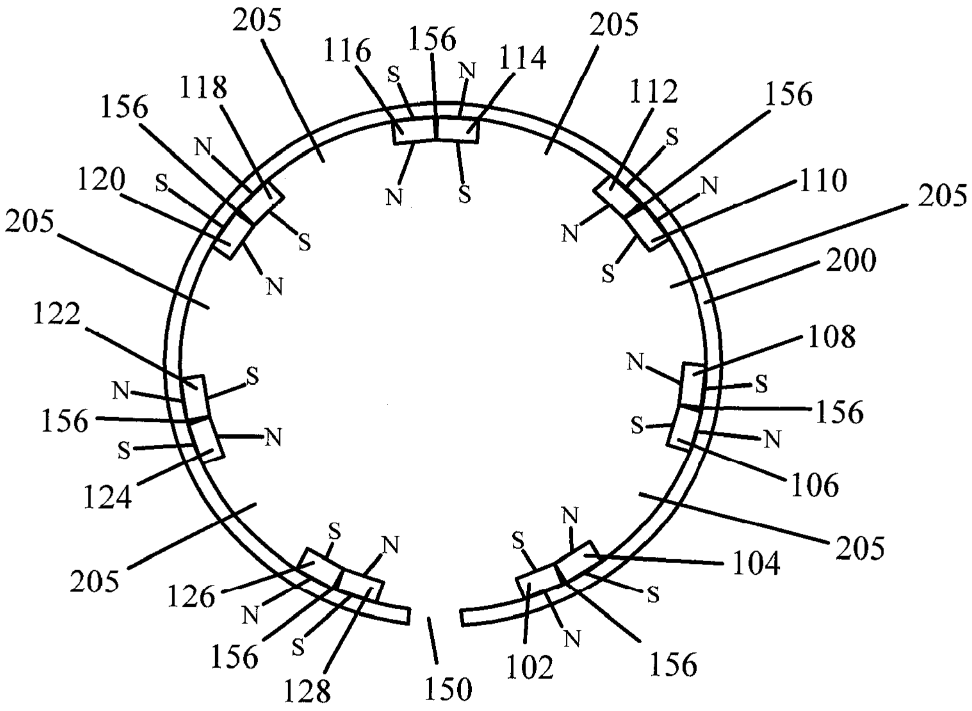
FIG. 2 is a top view of a permanent magnet array iron filter according to another embodiment of the present invention.
Figure 3:
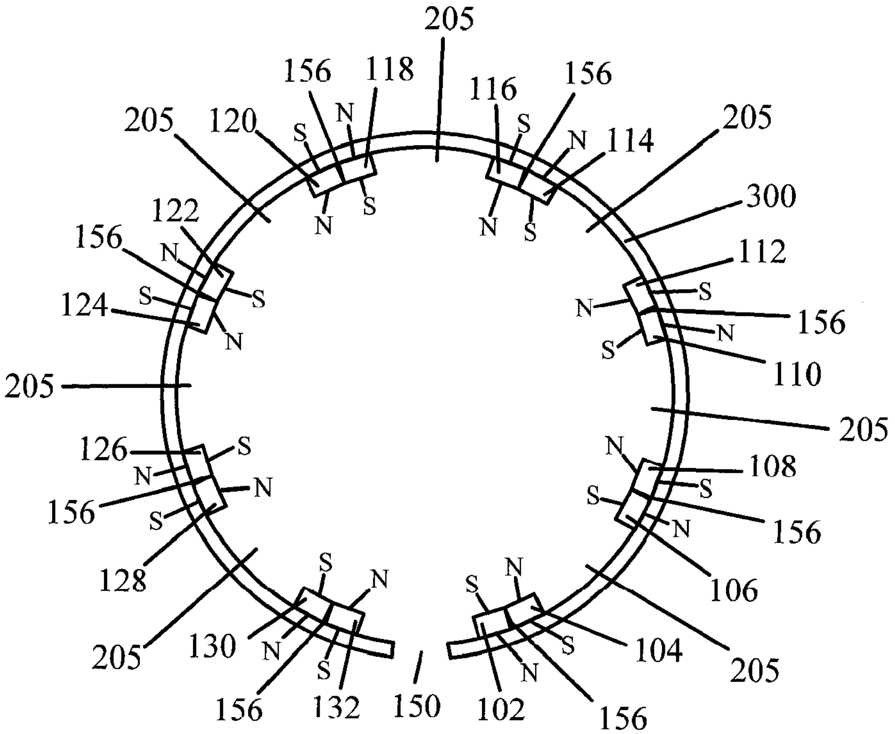
FIG. 3 is a top view of a permanent magnet array iron filter according to yet another embodiment of the present invention.

Referring now to FIGS. 2 and 3, embodiments having seven magnetic assemblies 156 (FIG. 2) and eight magnetic assemblies 156 (FIG. 3) are shown arranged generally symmetrically around the inside circumference of a collar 200 and 300 respectively. Collar 200 may be larger than collar 100 (FIG. 1) to provide for different size filter applications.

Referring to FIGS. 1-4, the height of collars 100, 200 and 300 depend on the specific application. Additionally, the height of collars 100, 200 and 300 can be longer than the height of magnetic assemblies 156 in order to protect the magnets from direct contact with objects and to further enhance the magnetic field characteristics therein. In practice, it has been found that having a collar with a height in a range 10 to 20 percent longer than the magnetic assembly, works well.

Typically, magnetic assembly 156 is composed of two magnets 102 and 104 as discussed above and the height of magnetic assembly 156 may vary depending on the application. The thickness of magnets 102 and 104 are chosen to be effective for a particular application. In general, the thicker the magnet, the stronger the magnetic field produced. In some applications utilized by the Applicants, 5 mm magnets were used. Various factors, such as available room and required strength of the magnetic field produced, help determine the dimensions of the magnets.

Figure 5:
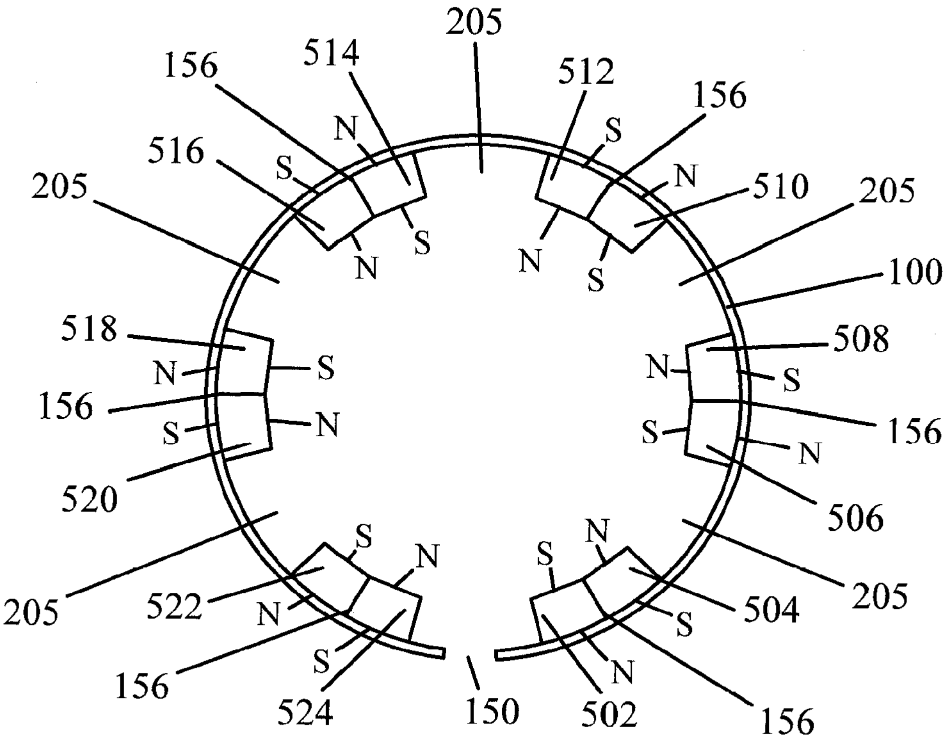
FIG. 5 is a top view of a permanent magnet array iron filter according to another embodiment of the present invention.

Referring now to FIG. 5, shaped magnets 502, 504, 506, 508, 510, 512, 514, 516, 518, 520, 522 and 524 are paired together in magnetic pairs making up magnetic assemblies 156. The magnets are manufactured to fit against each other with no air gap between the individual magnets in the magnetic pairs and fitted inside a collar 500. The magnets are manufactured with a specific geometry, namely an isosceles trapezoid and the dimensions are selected so that the sides align and focus the poles towards the center. It is also possible to have the outward surface of the magnets manufactured with a curvature to match the curvature of collar 500.

Figure 7:
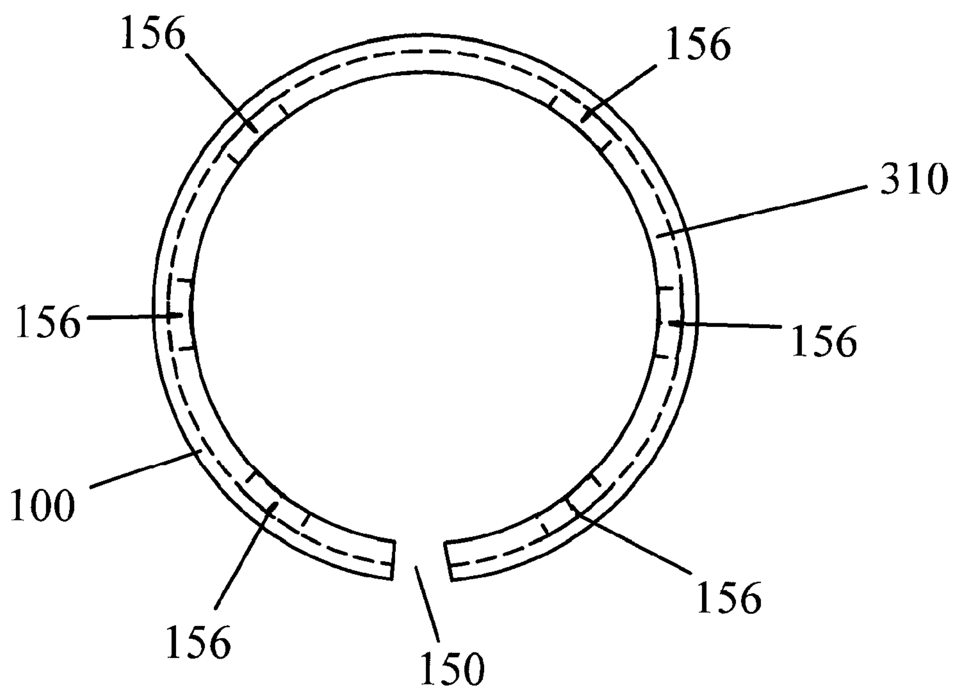
FIG. 7 is a top view of a permanent magnet array iron filter according to an embodiment of the present invention.
Figure 8:
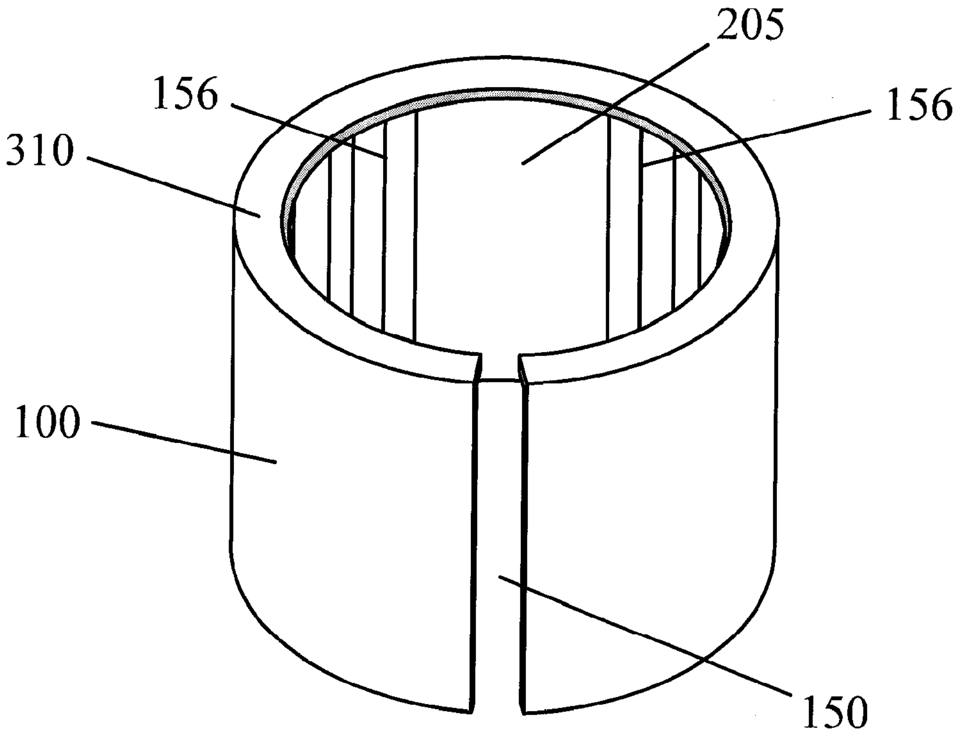
FIG. 8 is a perspective view of the permanent magnet array iron filter shown in FIG. 7.

Now reference is made to FIGS. 7 and 8, showing collar 100 having a flange portion 310 that protects magnetic assemblies 156. Both ends of collar 100 may have a flange portion 310 or only one end of collar 100 may have a flange portion 310 depending on the application. Flange portion 310 may be a folded portion of collar 100 or it may be a separate piece attached to collar 100.

Figure 9:
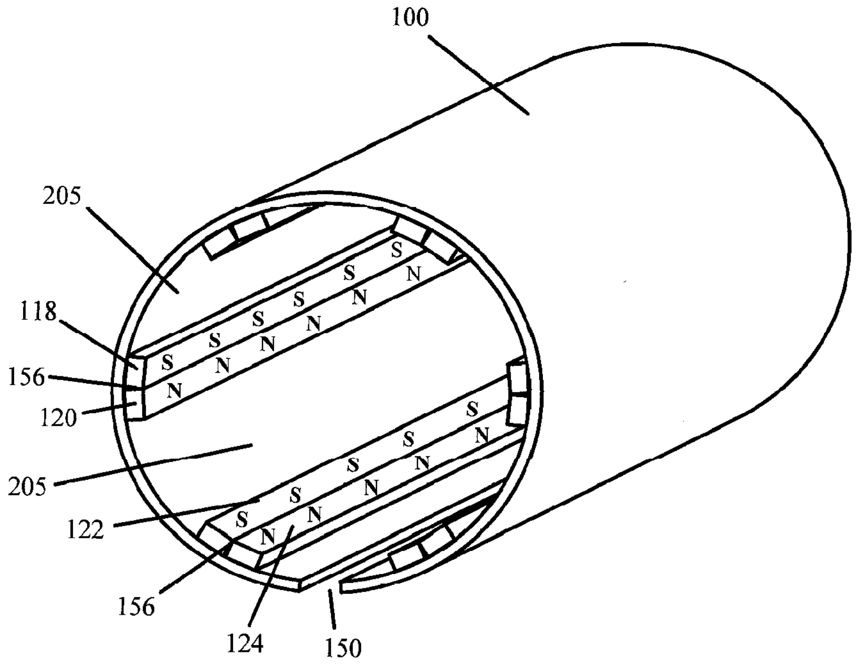
FIG. 9 is a perspective view of the permanent magnet array iron filter shown in FIG. 1 showing the direction of the magnetic poles according to an embodiment of the present invention.
Figure 10:
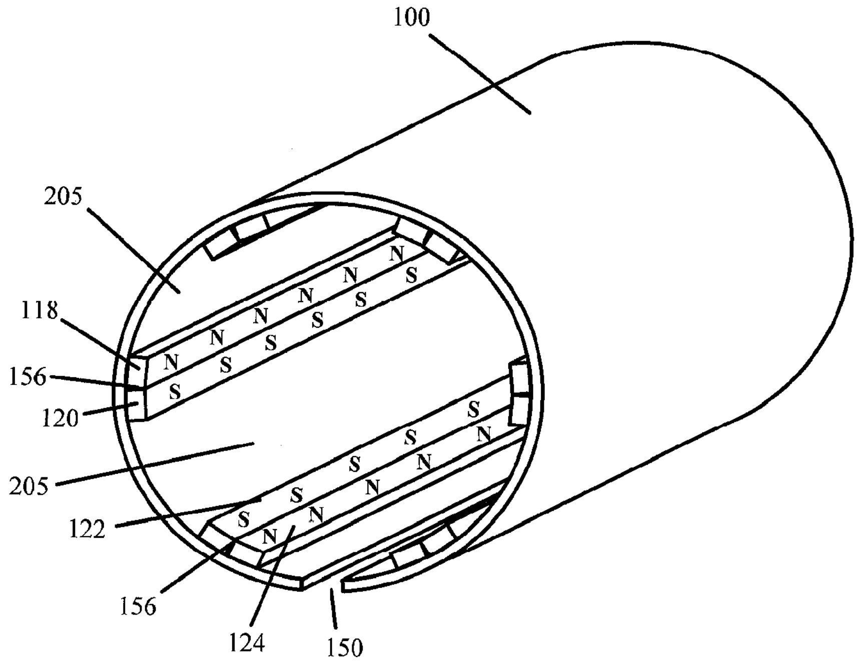
FIG. 10 is a perspective view of the permanent magnet array iron filter shown in FIG. 1 showing the direction of the magnetic poles according to another embodiment of the present invention.

Referring to FIGS. 9 and 10, collar 100 is shown having magnetic assemblies 156 aligned longitudinally along an inner surface of collar 100. Magnetic assemblies 156 comprise two magnets 122 and 124 (typical) and are arranged so that the South Pole of magnet 122 faces inward towards the center and the North Pole of magnet 124 also faces inward. Each magnetic assembly 156 is similarly constructed. Gaps 205 are disposed between adjacent magnetic assemblies 156. The polarity of the magnets in the adjacent magnetic assembly 156 may be arranged as in FIG. 9 so that a gap facing magnet 120 has the opposite polarity of an adjacent gap facing magnet 122 in the adjacent magnetic assembly 156 or as shown in FIG. 10 with gap facing magnet 120 having the same polarity as adjacent gap facing magnet 122 in the adjacent magnetic assembly 156. Either configuration in conjunction with gaps 205 provides long range projection of the magnetic field within the oil filter capable of capturing and holding iron particles to the inside of the oil filter as discussed below.

Referring now to FIG. 4, the permanent magnet array iron filter is typically utilized in conjunction with oil filter 154 by inserting oil filter 154 into the permanent magnet array iron filter. Because oil filter 154 has a steel housing and the steel housing is wrapped by the permanent magnet array iron filter, the permanent magnet array iron filter will remain attached even when subject to strong vibration.

As discussed above, the collar is made of a high magnetic material such as Hiperco® Perendur®, 2V Permendur®, Supermalloy®, 45 Permalloy®, Hipernik® Monimax® or other suitable material. The magnets should be rare earth magnets such as neodymium iron boron or samarium cobalt. The plurality of gaps 205 disposed between the magnetic assemblies and pairing the magnets within the magnetic assemblies provide for greater long range projection of the magnetic field within the oil filter to attract iron particles and to strongly hold the captured material on the inside surface of the oil filter while the oil is rapidly flowing through the oil filter. The iron particles and ferrous based contaminants are securely held in place on the inner surface of the oil filter by the permanent magnet array iron filter and then discarded with the used oil filter. This increases the longevity of the mechanical device or vehicle by removing an important source of mechanical wear from the lubricating system.

The collar is designed to enhance and direct the magnetic flux lines towards the center and to minimize flux leakage to a minimum towards the outside surfaces. Design of the permanent magnet array iron filter is constructed based on the following formula:

$$F=-\mu_o\chi VH\cdot\nabla H$$

The magnetic force F directed towards a particle from the magnet is a product of the magnitude of the magnetic field H and the magnitude of the magnetic field gradient, where $\chi$ is the magnetic susceptibility of the magnetic particle and V is the volume of the magnetic particles.

The number of magnetic assemblies used depends on the diameter of the collar in a particular application. The direction of the magnetization is perpendicular to the surface and this allows the magnetic field to penetrate throughout the selected target area. The magnetic energy product is selected to be in the range of 15 to 54 MGOe. Also, the temperature of the application determines the type of magnet used. In very high temperature applications, samarium cobalt magnets may be used up to temperatures of 572 degrees F.

Although the instant invention has been described in relation to particular embodiments thereof, many other variations and modifications and other uses will become apparent to those skilled in the art.

What is claimed is:

1. A permanent magnet array iron filter comprising:

a generally circular collar having an inner surface and outer surface;

a plurality of magnetic assemblies longitudinally disposed at selected intervals along said inner surface;

said magnetic assemblies having two magnets adjacently contacting and parallel with each other;

said two magnets each having an opposite pole radially facing said inner surface; and said magnetic assemblies being arranged parallel with each other; and a plurality of longitudinal gaps selectively spaced between each magnetic assembly whereby a magnetic effect is optimized for long range capturing and holding of iron particles within an oil filter.

2. A permanent magnet array iron filter according to claim 1 wherein said collar is made of a high magnetic permeability metal.

3. A permanent magnet array iron filter according to claim 1 wherein said collar is a high magnetic permeability metal selected from the group consisting of iron-silicon alloys, amorphous alloys, nano-crystalline alloys, nickel-iron alloys and soft ferrites.

4. A permanent magnet array iron filter according to claim 1 wherein said plurality of magnetic assemblies have a thickness selected to maximize said magnetic field for a selected application.

5. A permanent magnet array iron filter according to claim 1 wherein said generally circular collar is formed of a sheet of magnetic permeability metal.

6. A permanent magnet array iron filter according to claim 1 wherein said generally circular collar is formed of at least two sheets of magnetic permeability metal.

7. A permanent magnet array iron filter according to claim 1 wherein said magnets are rare earth magnets.

8. A permanent magnet array iron filter according to claim 1 wherein said generally circular collar has a height selected to match an application.

9. A permanent magnet array iron filter according to claim 1 wherein said plurality of magnetic assemblies have a height selected to match an application.

10. A permanent magnet array iron filter according to claim 1 wherein said generally circularly collar is made of an elastic material and has a gap disposed along a length thereof whereby said generally circular collar flexes to securely fit around an oil filter disposed therein.

11. A permanent magnet array iron filter according to claim 10 wherein said elastic material is spring steel.

12. A permanent magnet array iron filter according to claim 1 wherein at least a portion of said collar is coated with a corrosion resistant material.

13. A permanent magnet array iron filter according to claim 12 wherein said corrosion resistant material is plastic.

14. A permanent magnet array iron filter according to claim 1 further comprising a flange portion that projects towards a center of said permanent magnetic array iron filter and disposed on at least one of a top and bottom of said generally circular collar to provide protection for said magnetic assemblies.

15. A permanent magnet array iron filter according to claim 1 wherein said magnets are bar magnets.

16. A permanent magnet array iron filter according to claim 1 wherein said collar has a thickness selected to match an application.

17. A permanent magnet array iron filter according to claim 1 wherein said at least two magnets are isosceles trapezoids with dimensions selected to align with a center of said permanent magnetic array iron filter.

18. A permanent magnet array iron filter according to claim 1 wherein said generally circular collar has a gap disposed along a length thereof whereby said generally circular collar flexes to securely fit around an oil filter disposed therein.

19. A permanent magnet array iron filter according to claim 1 wherein a gap facing side of said magnetic assembly is arranged to have an opposite polarity as an adjacent gap facing side of another said magnetic assembly.

20. A permanent magnet array iron filter according to claim 1 wherein a gap facing side of said magnetic assembly is arranged to have a like polarity as an adjacent gap facing side of another said magnetic assembly.

* * * * *